(12) United States Patent
Yang et al.

(10) Patent No.: US 11,910,399 B2
(45) Date of Patent: *Feb. 20, 2024

(54) METHOD AND TERMINAL FOR RECEIVING PDSCH

(71) Applicant: VIVO MOBILE COMMUNICATION CO., LTD., Dongguan (CN)

(72) Inventors: Yu Yang, Dongguan (CN); Peng Sun, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/968,790

(22) Filed: Oct. 18, 2022

(65) Prior Publication Data

US 2023/0038981 A1 Feb. 9, 2023

Related U.S. Application Data

(63) Continuation of application No. 17/033,898, filed on Sep. 27, 2020, now Pat. No. 11,510,234, which is a (Continued)

(30) Foreign Application Priority Data

Mar. 29, 2018 (CN) .......................... 201810272571.9

(51) Int. Cl.
*H04W 72/23* (2023.01)
*H04L 41/0654* (2022.01)
(Continued)

(52) U.S. Cl.
CPC ......... *H04W 72/23* (2023.01); *H04L 41/0654* (2013.01); *H04L 41/0813* (2013.01); *H04W 24/08* (2013.01); *H04W 72/046* (2013.01)

(58) Field of Classification Search
CPC ... H04W 72/23; H04W 24/08; H04W 72/046; H04W 72/21; H04W 74/0833;
(Continued)

(56) References Cited

U.S. PATENT DOCUMENTS

2018/0324770 A1* 11/2018 Nogami .................. H04L 5/005
2019/0052432 A1* 2/2019 Islam .................... H04L 5/0053
(Continued)

OTHER PUBLICATIONS

First Office Action issued in related Chinese application No. 201810272571.9, dated Apr. 2, 2020, 11 pages.
(Continued)

*Primary Examiner* — Kiet Tang
(74) *Attorney, Agent, or Firm* — IPX PLLC

(57) ABSTRACT

This disclosure provides a method for receiving a PDSCH and a terminal thereof. The method for receiving a PDSCH includes: after occurrence of a beam failure event is determined, monitoring a PDCCH on a CORESET-BFR and a PDCCH on another CORESET, determining a QCL parameter of the PDSCH based on a QCL parameter of the PDCCH on the CORESET-BFR, a QCL parameter of the PDCCH on the another CORESET, a QCL parameter of a PDCCH on a CORESET that contains DCI scheduling the PDSCH, or a QCL parameter indicated by TCI state information in the DCI scheduling the PDSCH, and receiving the PDSCH based on the determined QCL parameter.

20 Claims, 2 Drawing Sheets

After occurrence of a beam failure event is determined, monitor a PDCCH on a CORESET-BFR and a PDCCH on another CORESET — 101

Determine a QCL parameter of a PDSCH based on a QCL parameter of the PDCCH on the CORESET-BFR, a QCL parameter of the PDCCH on the another CORESET, a QCL parameter of a PDCCH on a CORESET that contains DCI scheduling the PDSCH, or a QCL parameter indicated by TCI state information in the DCI scheduling the PDSCH, and receive the PDSCH based on the determined QCL parameter — 102

Related U.S. Application Data continuation of application No. PCT/CN2019/077791, filed on Mar. 12, 2019.

(51) Int. Cl.
*H04L 41/0813* (2022.01)
*H04W 24/08* (2009.01)
*H04W 72/044* (2023.01)

(58) Field of Classification Search
CPC ............. H04L 41/0654; H04L 41/0813; H04L 5/0091; H04L 5/0023; H04L 5/0005; H04L 5/0007; H04B 7/0695; H04B 7/06
See application file for complete search history.

(56) References Cited

U.S. PATENT DOCUMENTS

2019/0245737 A1* 8/2019 Zhou ..................... H04B 7/06
2021/0058129 A1* 2/2021 Takeda .................. H04B 7/088

OTHER PUBLICATIONS

Mediatek Inc, "Offline Discussion Summary on Remaining Issues on Beam Failure", 3GPP TSG RAN WG1 Meeting #91 R1-1721699.
Qualcomm, "Summary of Beam Mgmt Open Issues", 3GPP TSG RAN WG1 Meeting #91 R1-1721396, Nov. 29, 2017.

* cited by examiner

METHOD AND TERMINAL FOR RECEIVING PDSCH

CROSS-REFERENCE TO RELATED APPLICATIONS

This application is a continuation of U.S. application Ser. No. 17/033,898, filed on Sep. 27, 2020 (now U.S. Pat. No. 11,510,234), which is a bypass continuation of PCT Application No. PCT/CN2019/077791, filed on Mar. 12, 2019, which claims priority to Chinese Patent Application No. 201810272571.9, filed on Mar. 29, 2018. The entire contents of each of the above-identified applications are expressly incorporated herein by reference.

TECHNICAL FIELD

Embodiments of this disclosure relate to the field of wireless communications technologies, and in particular, to a method for receiving a Physical Downlink Shared Channel (PDSCH) and a terminal thereof.

BACKGROUND

With development of communications technologies, communication efficiency has received increasing attention. The following introduces a few technical terms.

1. Multi-Antenna

Standards for radio access technologies such as Long Term Evolution (LTE)/LTE-advanced (LTE-A) are built based on technologies of Multiple-Input Multiple-Output (MIMO) and Orthogonal Frequency Division Multiplexing (OFDM). The MIMO technology takes advantage of a spatial degree of freedom brought by a multi-antenna system to improve a peak rate and a system spectrum utilization.

It can be foreseen that in the future 5G mobile communications system, the massive MIMO technology with more antenna ports will be introduced. The massive MIMO technology uses a larger quantity of antenna arrays, and can greatly improve system frequency band utilization efficiency and support a larger quantity of access users.

2. High Frequency Band

In studies on a next-generation communications system later than 4G, an operating frequency band above 6 GHz or even up to a maximum of about 100 GHz is supported by the system. The high frequency band has relatively abundant free frequency resources and can provide a higher throughput for data transmission. At present, the 3GPP has completed the work of modeling for high frequency channels. High frequency signals have shorter wavelengths. Compared with a low frequency band, the high frequency band allows deployment of more antenna arrays on a panel of the same size and uses a beamforming technology to form a beam with better directivity and narrower wave lobes. Therefore, a combination of massive antennas and high frequency communication is one of the future trends.

3. Beam Failure Recovery Mechanism

In the high frequency band communications system, cases such as possible blocking of signal propagation due to a relatively short wavelength of a radio signal cause interrupted signal propagation. Use of radio link rebuilding in the prior art is time-consuming, and therefore, the beam failure recovery mechanism is introduced. The mechanism includes the following four steps:

(1) A terminal determines occurrence of a beam failure event.

(2) The terminal selects a candidate beam.

(3) The terminal sends a beam failure recovery request.

(4) The terminal monitors a control resource set used for beam failure recovery (Control Resource Set Beam Failure Recovery, CORESET-BFR) configured for the terminal by a network device, and receives a dedicated Physical Downlink Control Channel (PDCCH), so as to receive response information from the network device in response to the beam failure recovery request.

When the terminal receives a PDSCH during beam failure recovery, the terminal assumes that a PDSCH DMRS (demodulation reference signal) port and the monitored PDCCH are quasi co-located (Quasi-colocation, QCL).

Whether to monitor another network-configured Control-Resource Set (CORESET) before a beam failure when a response in the PDCCH on the CORESET-BFR is monitored during beam failure recovery is not described in the prior art. When the two CORESETs need to be monitored, there is no solution to determining a QCL parameter of the PDSCH to enable the terminal to correctly receive the PDSCH.

SUMMARY

Embodiments of this disclosure provide a method for receiving a PDSCH and a terminal thereof, so as to resolve an issue of how to correctly receive a PDSCH during beam failure recovery.

To resolve the foregoing issue, this disclosure is implemented as follows:

According to a first aspect, an embodiment of this disclosure provides a method, for receiving a PDSCH, applied to a terminal and including:

after occurrence of a beam failure event is determined, monitoring a PDCCH on a CORESET-BFR and a PDCCH on another CORESET, where the CORESET-BFR and the another CORESET are configured for the terminal by a network device; and determining a QCL parameter of the PDSCH based on a QCL parameter of the PDCCH on the CORESET-BFR, a QCL parameter of the PDCCH on the another CORESET, a QCL parameter of a PDCCH on a CORESET that contains Downlink Control Information (DCI) scheduling the PDSCH, or a QCL parameter indicated by Transmission Configuration Indication (TCI) state information in the DCI scheduling the PDSCH, and receiving the PDSCH based on the determined QCL parameter.

According to a second aspect, an embodiment of this disclosure provides a terminal, including:

a monitoring module, configured to, after occurrence of a beam failure event is determined, monitor a PDCCH on a CORESET-BFR and a PDCCH on another CORESET, where the CORESET-BFR and the another CORESET are configured for the terminal by a network device;

a determining module, configured to determine a QCL parameter of a PDSCH based on a QCL parameter of the PDCCH on the CORESET-BFR, a QCL parameter of the PDCCH on the another CORESET, a QCL parameter of a PDCCH on a CORESET that contains DCI scheduling the PDSCH, or a QCL parameter indicated by TCI state information in the DCI scheduling the PDSCH; and a receiving module, configured to receive the PDSCH based on the determined QCL parameter.

According to a third aspect, an embodiment of this disclosure provides a terminal, including a processor, a memory, and a program that is stored in the memory and capable of running on the processor. When the program is executed by the processor, the steps of the foregoing method for receiving a PDSCH are implemented.

According to a fourth aspect, an embodiment of this disclosure provides a computer-readable storage medium, the computer-readable storage medium storing a program, where when the program is executed by a processor, the steps of the foregoing method for receiving a PDSCH are implemented.

In the embodiments of this disclosure, the QCL parameter of the PDSCH can be determined during beam failure recovery, so that the PDSCH is correctly received.

DETAILED DESCRIPTION

The following describes the technical solutions in the embodiments of this disclosure with reference to the accompanying drawings in the embodiments of this disclosure. Apparently, the described embodiments are some rather than all of the embodiments of this disclosure. Based on the embodiments of this disclosure, all other embodiments derived by persons of ordinary skill in the art without creative efforts fall within the protection scope of this disclosure.

Figure 1:
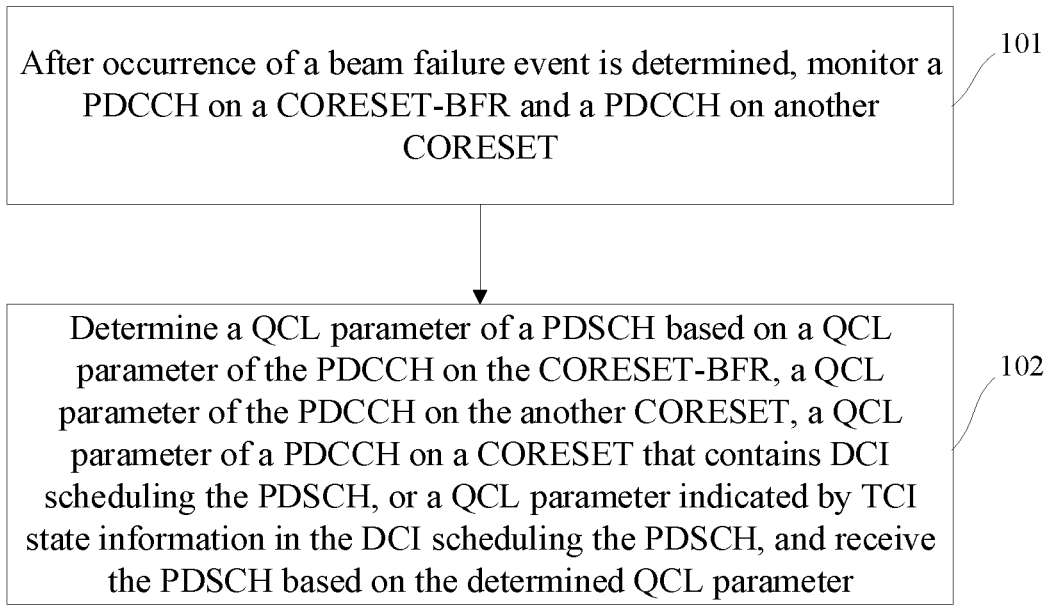
FIG. 1 is a schematic flowchart of a method for receiving a PDSCH according to an embodiment of this disclosure.

Referring to FIG. 1, an embodiment of this disclosure provides a method for receiving a PDSCH, applied to a terminal and including:

Step 101: After occurrence of a beam failure event is determined, monitor a PDCCH on a CORESET-BFR and a PDCCH on another CORESET, where the CORESET-BFR and the another CORESET are configured for the terminal by a network device.

Step 102: Determine a QCL parameter of the PDSCH based on a QCL parameter of the PDCCH on the CORESET-BFR, a QCL parameter of the PDCCH on the another CORESET, a QCL parameter of a PDCCH on a CORESET that DCI scheduling the PDSCH, or a QCL parameter indicated by TCI state information in the DCI scheduling the PDSCH, and receive the PDSCH based on the determined QCL parameter.

The another CORESET is a CORESET other than the CORESET-BFR that is configured for the terminal by the network device.

In this embodiment of this disclosure, the QCL parameter of the PDSCH can be determined during beam failure recovery, so that the PDSCH is correctly received.

In this embodiment of this disclosure, before the step of determining a QCL parameter of the PDSCH, the method further includes:

receiving configuration information, sent by the network device, of the CORESET-BFR and the another CORESET, where the configuration information includes TCI state information used to indicate the QCL parameter of the PDCCH on the CORESET-BFR and TCI state information used to indicate the QCL parameter of the PDCCH on the another CORESET.

The CORESET-BFR is configured to monitor a gNB response on a dedicated PDCCH during beam failure recovery. The response is response information fed back by the network device (which is the gNB) in response to a beam failure recovery request sent by the terminal. The beam failure recovery request is sent to the network device after occurrence of the beam failure event is determined, which is described in detail in the following content.

The another CORESET is configured to transmit a PDCCH during normal communication. Before the terminal determines occurrence of the beam failure event, the terminal monitors the another CORESET other than the CORESET-BFR configured by the network device, so as to receive the PDCCH.

In this embodiment of this disclosure, the QCL parameter of the PDCCH on the another CORESET and the QCL parameter of the PDCCH on the CORESET-BFR are the same or different.

In this embodiment of this disclosure, the network device sends the configuration information of the CORESET-BFR and the another CORESET to the terminal by using higher-layer signaling.

In the related technology, the network device configures a correspondence between a TCI state and a Reference Signal (RS) for the terminal by using Radio Resource Control (RRC) signaling.

When the TCI is used for QCL indication for a PDCCH, the network device configures K (K is an integer greater than or equal to 1) TCI states for each CORESET. When K>1, MAC CE indicates one TCI state. When K=1, no additional MAC CE signaling is required. When the terminal monitors the PDCCH on the CORESET, the same QCL (i.e., the same TCI state) is used for PDCCHs of all search spaces (search space) within the CORESET.

RRC signaling or RRC+MAC CE is used to notify one TCI state, and an RS resource (such as a periodic CSI-RS resource, a semi-persistent CSI-RS resource, or an SS block) in an RS set corresponding to the TCI state and a UE (user equipment or user device)-specific PDCCH DMRS (demodulation reference signal) port are spatial QCL. UE can determine, based on the TCI state, to use which receive beam for receiving the PDCCH.

When the TCI is used for QCL indication for a PDSCH, the network device activates $2^N$ (N is a positive integer greater than or equal to 1) TCI states and notifies the TCI states by using an N-bit TCI field in DCI. An RS resource in an RS set corresponding to the TCI states and a DMRS port of the PDSCH to be scheduled are QCL. The terminal can determine, based on the TCI states, to use which receive beam for receiving the PDSCH. In two cases in which the DCI contains or does not contain the TCI field, when a scheduling offset is less than or equal to k (the scheduling offset is a time interval between a time of receiving the DCI and a time of receiving a PDSCH scheduled by the DCI), k is a preset threshold, and a default TCI state is used for the QCL of the PDSCH. The default TCI state is a control channel QCL indication, and the control channel QCL indication is determined by a TCI state of a CORESET with a smallest ID in a slot in which a control channel exists.

For initial TCI states of a PDCCH and a PDSCH, between initial RRC configuration and activation of the TCI states by using the MAC CE, a PDCCH DMRS and a PDSCH DMRS are spatial QCL with a Synchronization Signal Block (SSB) that is determined upon initial access.

The following describes a beam failure recovery process in detail.

In this embodiment of this disclosure, the terminal first performs beam failure detection. In some implementations, the terminal measures a Beam Failure Detection Reference Signal (BFD RS) at a physical layer and determines whether a beam failure event occurs based on a measurement result. A determining criterion is as follows: If it is detected that metrics (hypothetical PDCCH BLER) of all serving control beams meet a preset condition (e.g., exceeding a preset threshold), one beam failure instance is determined. The physical layer of the terminal reports an indication to a higher layer (e.g., a MAC layer) of the terminal. The reporting is made periodically. However, if it is determined that no beam failure instance occurs, no indication is reported to the higher layer. The higher layer of the terminal uses a counter to count the indications reported by the physical layer. When a maximum count configured by a network device is reached, the terminal determines that a beam failure event occurs.

The terminal further needs to perform new candidate beam identification: The physical layer of the terminal measures a candidate beam RS and searches for a new candidate beam. The step of searching for a new candidate beam is not necessarily performed after occurrence of a beam failure event is determined. The step can also be performed before the determining of a beam failure event. When the physical layer of the terminal receives a request, an instruction, or a notification from the higher layer (e.g., the MAC layer) of the terminal, the physical layer of the terminal reports, to the higher layer of the terminal, a measurement result that the preset condition (measurement quality of the candidate beam RS exceeds a preset L1-RSRP threshold) is met, and the report content is {beam RS index, L1-RSRP}. The higher layer of the terminal selects a candidate beam based on the reporting from the physical layer.

In this embodiment of this disclosure, after occurrence of the beam failure event is determined and the new candidate beam is found, and before the step of monitoring a PDCCH on a CORESET-BFR, the beam failure recovery process further includes: sending a beam failure recovery request to the network device.

In some implementations, the higher layer (e.g., the MAC layer) of the terminal determines a Physical Random Access Channel (PRACH) resource/sequence based on the selected candidate beam. If the terminal determines that a triggering condition of the beam failure recovery request is met, the terminal sends the beam failure recovery request to the network device on a non-contention-based PRACH. The terminal needs to send the beam failure recovery request based on a quantity of times of sending the beam failure recovery request and/or a timer configured by the network device. A non-contention-based PRACH resource herein and other PRACH resources (such as a PRACH resource used for initial access) may be Frequency Division Multiplexing (FDM) or Code Division Multiplexing (CDM). PRACH preambles in CDM need to be designed with a same sequence.

In this embodiment of this disclosure, after sending the beam failure recovery request to the network device, the terminal monitors response information of the network device in response to the beam failure recovery request (UE monitors a gNB response for beam failure recovery request). After receiving the beam failure recovery request, the network device sends a response in a dedicated PDCCH on a CORESET-BFR. The beam failure recovery request carries a Cell Radio Network Temporary Identifier (C-RNTI) and may possibly further include an instruction for switching to the new candidate beam, an instruction for restarting beam searching, or another instruction. The CORESET-BFR and a Downlink Reference Signal (DL RS) of a candidate beam found by the terminal are spatial QCL. If beam failure recovery fails, the physical layer of the terminal sends an instruction to the higher layer of the terminal for the higher layer to determine a subsequent radio link failure process.

That is, the step of monitoring a PDCCH on a CORESET-BFR includes: monitoring the response information in the PDCCH on the CORESET-BFR, where the response information is response information fed back by the network device in response to the beam failure recovery request.

In this embodiment of this disclosure, the step of monitoring a PDCCH on a CORESET-BFR and a PDCCH on another CORESET includes:

monitoring response information in the PDCCH on the CORESET-BFR within a monitoring window configured by the network device; and monitoring the PDCCH on the another CORESET within the monitoring window and/or outside the monitoring window.

In some implementations, after a specified period of time for sending the beam failure recovery request elapses, the terminal monitors a gNB response in a dedicated PDCCH on the CORESET-BFR within the monitoring window configured by the network device, so as to determine whether beam failure recovery is successful.

The another CORESET may be monitored within the monitoring window, may be monitored outside the monitoring window, or may be monitored constantly.

The following describes in detail a method of determining a QCL parameter of a PDSCH in this embodiment of this disclosure.

In this embodiment of this disclosure, a different approach for receiving a PDSCH may be determined based on a magnitude relationship between a preset threshold and a time interval (also referred to as "a scheduling offset") between a time of receiving the DCI and a time of receiving the PDSCH scheduled by the DCI is less than a preset threshold.

(1) In a case that the time interval between the time of receiving the DCI and the time of receiving the PDSCH scheduled by the DCI is less than the preset threshold, a first approach is used to determine the QCL parameter of the PDSCH, where the first approach is one of the following approaches:

(11) determining that the QCL parameter of the PDSCH is the same as the QCL parameter of the PDCCH on the CORESET-BFR;

(12) determining that the QCL parameter of the PDSCH is the same as a QCL parameter of a PDCCH on a preset CORESET in the another CORESET;

(13) determining that the QCL parameter of the PDSCH is the same as a QCL parameter of a PDCCH on a preset CORESET in all CORESETs, where all the CORESETs include the CORESET-BFR and the another CORESET;

(14) determining that the QCL parameter of the PDSCH is the same as the QCL parameter of the PDCCH on the CORESET that contains the DCI scheduling the PDSCH; or

(15) determining that the QCL parameter of the PDSCH is the same as a QCL parameter of a PDCCH on a preset CORESET of a CORESET that contains a plurality of pieces of DCI scheduling the PDSCH.

The foregoing preset CORESET is a CORESET with a smallest ID in one or more CORESETs configured with a search space within a slot in which a search space is configured for the terminal. Certainly, the foregoing preset CORESET may be another preset CORESET or a CORESET with a largest ID in the one or more CORESETs configured with a search space within the slot in which the search space is configured for the terminal.

In this embodiment of this disclosure, the step of using a first approach to determine the QCL parameter of the PDSCH when a time interval between a time of receiving the DCI and a time of receiving the PDSCH scheduled by the DCI is less than a preset threshold includes:

in a case that the DCI contains no TCI state information used to indicate a QCL parameter (for example, DCI format 1_0 is used to schedule the PDSCH, and the DCI format 1_0 contains no TCI state information used to indicate a QCL parameter) and the time interval is less than the preset threshold, using the first approach to determine the QCL parameter of the PDSCH;

in a case that the network device configures a preset parameter (for example, TCI-PresentInDCI) for the terminal, where the preset parameter is used to indicate whether the DCI contains TCI state information, a value of the preset parameter is valid (for example, Enabled), and the time interval is less than the preset threshold, using the first approach to determine the QCL parameter of the PDSCH; or in a case that the network device configures the preset parameter (for example, TCI-PresentInDCI) for the terminal, a value of the preset parameter is invalid (for example, Disabled), and the time interval is less than the preset threshold, using the first approach to determine the QCL parameter of the PDSCH.

The preset parameter is configured for the terminal by the network device by using higher-layer signaling.

(2) In a case that the time interval between the time of receiving the DCI and the time of receiving the PDSCH scheduled by the DCI is greater than or equal to the preset threshold, a second approach is used to determine the QCL parameter of the PDSCH, where the second approach is one of the following approaches:

(21) determining that the QCL parameter of the PDSCH is the same as the QCL parameter of the PDCCH on the CORESET-BFR;

(22) in a case that the network device configures a preset parameter (for example, TCI-PresentInDCI) for the terminal, where the preset parameter is used to indicate whether the DCI contains TCI state information, and a value of the preset parameter is valid (for example, Enabled), determining that the QCL parameter of the PDSCH is the QCL parameter indicated by the TCI state information in the DCI scheduling the PDSCH;

(23) in a case that the DCI contains no TCI state information used to indicate a QCL parameter (for example, DCI format 1_0 is used to schedule the PDSCH, and the DCI format 1_0 contains no TCI state information used to indicate a QCL parameter), determining that the QCL parameter of the PDSCH is the same as the QCL parameter of the PDCCH on the CORESET that contains the DCI scheduling the PDSCH; or

(24) in a case that the network device configures the preset parameter (for example, TCI-PresentInDCI) for the terminal and a value of the preset parameter is invalid (for example, Disabled), determining that the QCL parameter of the PDSCH is the same as the QCL parameter of the PDCCH on the CORESET that contains the DCI scheduling the PDSCH.

The preset parameter is configured for the terminal by the network device by using higher-layer signaling.

In this embodiment of this disclosure, for example, after the step of determining a QCL parameter of the PDSCH based on a QCL parameter of the PDCCH on the CORESET-BFR, a QCL parameter of the PDCCH on the another CORESET, a QCL parameter of a PDCCH on a CORESET that contains DCI scheduling the PDSCH, or a QCL parameter indicated by TCI state information in the DCI scheduling the PDSCH, the method further includes:

redetermining the QCL parameter of the PDSCH when receiving from the network device a reconfiguration, activation, or indication for TCI state information of PDCCHs in all CORESETs, where all the CORESETs include the CORESET-BFR and the another CORESET;

redetermining the QCL parameter of the PDSCH when receiving from the network device a reconfiguration, activation, or indication for TCI state information of the PDCCH on the CORESET-BFR;

redetermining the QCL parameter of the PDSCH when receiving from the network device a reconfiguration, activation, or indication for TCI state information of a PDCCH on any CORESET in all the CORESETs;

redetermining the QCL parameter of the PDSCH when receiving from the network device a reconfiguration, activation, or indication for TCI state information of a PDCCH on any CORESET in the another CORESET; or redetermining the QCL parameter of the PDSCH when receiving from the network device a reconfiguration, activation, or indication for TCI state information of PDCCHs on all the other CORESETs.

Figure 2:
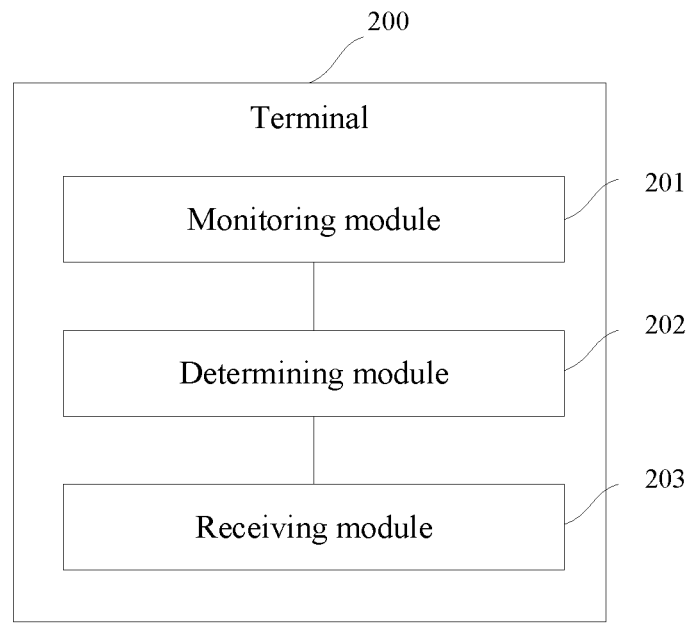
FIG. 2 is a schematic structural diagram of a terminal according to an embodiment of this disclosure.

Referring to FIG. 2, an embodiment of this disclosure further provides a terminal 200, including:

a monitoring module 201, configured to monitor a PDCCH on a CORESET-BFR and a PDCCH on another CORESET during beam failure recovery, where the CORESET-BFR and the another CORESET are configured for the terminal by a network device;

a determining module 202, configured to determine a QCL parameter of a PDSCH based on a QCL parameter of the PDCCH on the CORESET-BFR, a QCL parameter of the PDCCH on the another CORESET, a QCL parameter of a PDCCH on a CORESET that contains DCI scheduling the PDSCH, or a QCL parameter indicated by TCI state information in the DCI scheduling the PDSCH; and a receiving module 203, configured to receive the PDSCH based on the determined QCL parameter.

In this embodiment of this disclosure, the QCL parameter of the PDSCH can be determined during beam failure recovery, so that the PDSCH is correctly received.

In some implementations, the receiving module is further configured to receive configuration information, sent by the network device, of the CORESET-BFR and the another CORESET, where the configuration information includes TCI state information used to indicate the QCL parameter of the PDCCH on the CORESET-BFR and TCI state information used to indicate the QCL parameter of the PDCCH on the another CORESET.

In some implementations, the QCL parameter of the PDCCH on the another CORESET and the QCL parameter of the PDCCH on the CORESET-BFR are the same or different.

In some implementations, the terminal further includes:

a sending module, configured to send a beam failure recovery request to the network device; and the monitoring module, configured to monitor response information in the PDCCH on the CORESET-BFR, where the response information is response information fed back by the network device in response to the beam failure recovery request.

In some implementations, the monitoring module is further configured to monitor response information in the PDCCH on the CORESET-BFR within a monitoring window configured by the network device and monitor the PDCCH on the another CORESET within the monitoring window and/or outside the monitoring window.

In some implementations, the determining module is configured to, when a time interval between a time of receiving the DCI and a time of receiving the PDSCH scheduled by the DCI is less than a preset threshold, use a first approach to determine the QCL parameter of the PDSCH, where the first approach is one of the following approaches:

determining that the QCL parameter of the PDSCH is the same as the QCL parameter of the PDCCH on the CORESET-BFR;

determining that the QCL parameter of the PDSCH is the same as a QCL parameter of a PDCCH on a preset CORESET in the another CORESET;

determining that the QCL parameter of the PDSCH is the same as a QCL parameter of a PDCCH on a preset CORESET in all CORESETs, where all the CORESETs include the CORESET-BFR and the another CORESET;

determining that the QCL parameter of the PDSCH is the same as the QCL parameter of the PDCCH on the CORESET that contains the DCI scheduling the PDSCH; or determining that the QCL parameter of the PDSCH is the same as a QCL parameter of a PDCCH on a preset CORESET of a CORESET that contains a plurality of pieces of DCI scheduling the PDSCH.

In some implementations, the determining module is configured to use the first approach to determine the QCL parameter of the PDSCH in a case that the DCI contains no TCI state information used to indicate a QCL parameter and the time interval is less than the preset threshold; or use the first approach to determine the QCL parameter of the PDSCH in a case that the network device configures a preset parameter for the terminal, where the preset parameter is used to indicate whether the DCI contains TCI state information, a value of the preset parameter is valid, and the time interval is less than the preset threshold; or use the first approach to determine the QCL parameter of the PDSCH in a case that the network device configures the preset parameter for the terminal, a value of the preset parameter is invalid, and the time interval is less than the preset threshold.

In some implementations, the preset CORESET is a CORESET with a smallest ID in one or more CORESETs that are configured with a search space within a slot in which a search space is configured for the terminal.

In some implementations, the determining module is configured to, in a case that the time interval between the time of receiving the DCI and the time of receiving the PDSCH scheduled by the DCI is greater than or equal to the preset threshold, use a second approach to determine the QCL parameter of the PDSCH, where the second approach is one of the following approaches:

determining that the QCL parameter of the PDSCH is the same as the QCL parameter of the PDCCH on the CORESET-BFR;

in a case that the network device configures a preset parameter for the terminal, where the preset parameter is used to indicate whether the DCI contains TCI state information, and a value of the preset parameter is valid, determining that the QCL parameter of the PDSCH is the QCL parameter indicated by the TCI state information in the DCI scheduling the PDSCH;

in a case that the DCI contains no TCI state information used to indicate a QCL parameter, determining that the QCL parameter of the PDSCH is the same as the QCL parameter of the PDCCH on the CORESET that contains the DCI scheduling the PDSCH; or in a case that the network device configures the preset parameter for the terminal and a value of the preset parameter is invalid, determining that the QCL parameter of the PDSCH is the same as the QCL parameter of the PDCCH on the CORESET that contains the DCI scheduling the PDSCH.

In some implementations, the terminal further includes:

a redetermining module, configured to redetermine the QCL parameter of the PDSCH when receiving from the network device a reconfiguration, activation, or indication for TCI state information of PDCCHs in all CORESETs, where all the CORESETs include the CORESET-BFR and the another CORESET; or redetermine the QCL parameter of the PDSCH when receiving from the network device a reconfiguration, activation, or indication for TCI state information of the PDCCH on the CORESET-BFR; or redetermine the QCL parameter of the PDSCH when receiving from the network device a reconfiguration, activation, or indication for TCI state information of a PDCCH on any CORESET in all the CORESETs; or redetermine the QCL parameter of the PDSCH when receiving from the network device a reconfiguration, activation, or indication for TCI state information of a PDCCH on any CORESET in the another CORESET; or redetermine the QCL parameter of the PDSCH when receiving from the network device a reconfiguration, activation, or indication for TCI state information of PDCCHs on all the other CORESETs.

Figure 3:
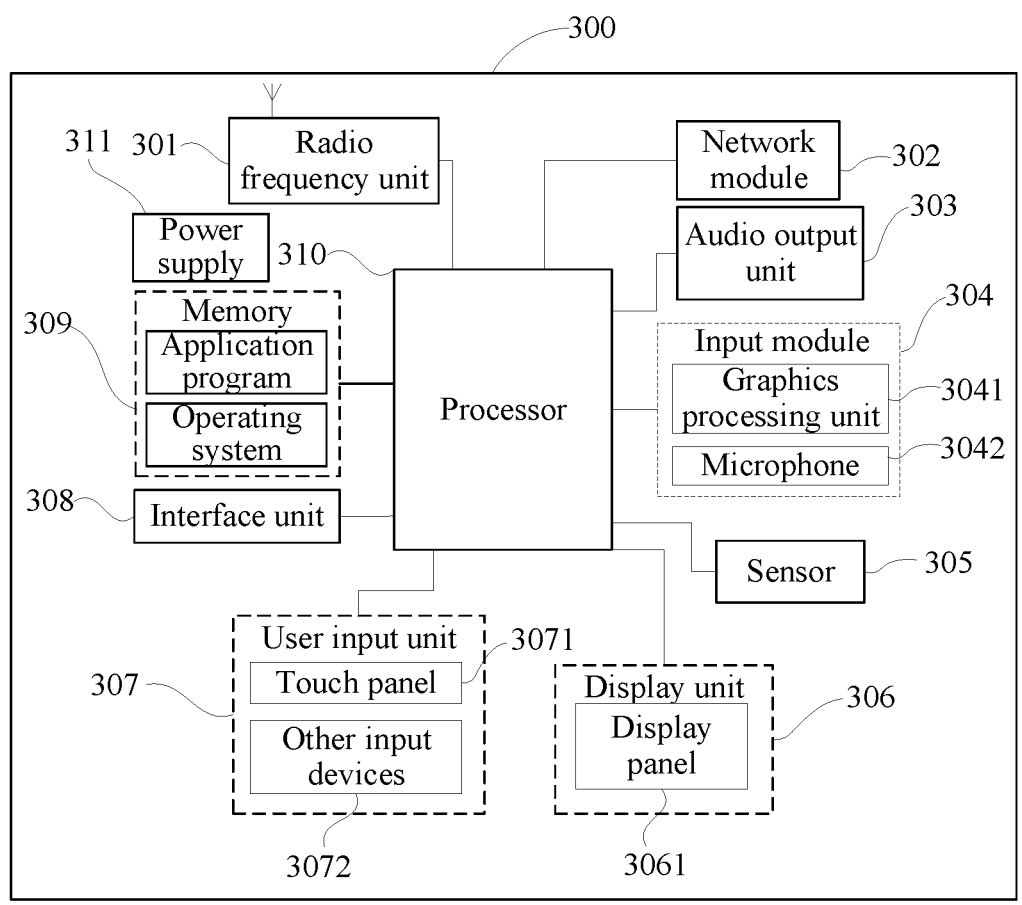
FIG. 3 is a schematic structural diagram of a terminal according to another embodiment of this disclosure.

FIG. 3 is a schematic diagram of a hardware structure of a terminal that implements the embodiments of this disclosure. The terminal 300 includes but is not limited to components such as a radio frequency unit 301, a network module 302, an audio output unit 303, an input unit 304, a sensor 305, a display unit 306, a user input unit 307, an interface unit 308, a memory 309, a processor 310, and a power supply 311. A person skilled in the art can understand that the structure of the terminal shown in FIG. 3 does not constitute a limitation on the terminal, and the terminal may include more or fewer components than those shown in the figure, or a combination of some components, or the components disposed differently. In the embodiments of this disclosure, the terminal includes but is not limited to a mobile phone, a tablet computer, a laptop computer, a personal digital assistant, an in-vehicle terminal, a wearable device, or a pedometer.

The processor 310 is configured to, after occurrence of a beam failure event is determined, monitor a PDCCH on a CORESET-BFR and a PDCCH on another CORESET, where the CORESET-BFR and the another CORESET are configured for the terminal by a network device, and determine a QCL parameter of a PDSCH based on a QCL parameter of the PDCCH on the CORESET-BFR, a QCL parameter of the PDCCH on the another CORESET, a QCL parameter of a PDCCH on a CORESET that contains DCI scheduling the PDSCH, or a QCL parameter indicated by TCI state information in the DCI scheduling the PDSCH.

The radio frequency unit 301 is configured to receive the PDSCH based on the determined QCL parameter.

In this embodiment of this disclosure, the QCL parameter of the PDSCH can be determined during beam failure recovery, so that the PDSCH is correctly received.

It should be understood that in this embodiment of this disclosure, the radio frequency unit 301 may be configured to receive and send signals during an information receiving and sending process or a call process. In some implementations, the radio frequency unit 301 receives downlink data from a base station, then delivers the downlink data to the processor 310 for processing, and sends uplink data to the base station. Generally, the radio frequency unit 301 includes but is not limited to an antenna, at least one amplifier, a transceiver, a coupler, a low noise amplifier, a duplexer, and the like. In addition, the radio frequency unit 301 may further communicate with a network and another device through a wireless communications system.

The terminal provides wireless broadband internet access for the user by using the network module 302 and helps the user to, for example, send and receive an email, browse a webpage, or access streaming media.

The audio output unit 303 may convert audio data that is received by the radio frequency unit 301 or the network module 302 or that is stored in the memory 309 into an audio signal and outputs the audio signal as a sound. In addition, the audio output unit 303 may further provide audio output related to a specific function (such as a calling signal receive sound and a message receive sound) executed by the terminal 300. The audio output unit 303 includes a loudspeaker, a buzzer, a receiver, and the like.

The input unit 304 is configured to receive an audio or video signal. The input unit 304 may include a Graphics Processing Unit (GPU) 3041 and a microphone 3042. The graphics processing unit 3041 processes image data in a static picture or video obtained by an image capturing apparatus (for example, a camera) in a video capturing mode or an image capturing mode. A processed image frame may be displayed on the display unit 306. The image frame obtained after processing by the graphics processing unit 3041 may be stored in the memory 309 (or another storage medium) or sent by the radio frequency unit 301 or the network module 302. The microphone 3042 may receive a sound and is capable of processing the sound as audio data. The processed audio data may be converted, in a phone service mode, into a format that can be sent by the radio frequency 301 to a mobile communication base station.

The terminal 300 may further include at least one sensor 305 such as a light sensor, a motion sensor, and another sensor. In some implementations, the light sensor includes an ambient light sensor and a proximity sensor. The ambient light sensor may adjust luminance of a display panel 3061 based on brightness of ambient light, and the proximity sensor may turn off the display panel 3061 and/or backlighting when the terminal 300 moves to an ear. As a type of motion sensor, an accelerometer sensor can detect a value of an acceleration in each direction (usually, there are three axes), can detect a magnitude and a direction of gravity when the terminal is static, and may be configured to recognize a mobile terminal posture (for example, screen switching between a landscape mode and a portrait mode, a related game, and magnetometer posture calibration), implement a vibration recognition related function (such as a pedometer and knocking), and the like. The sensor 305 may further include a fingerprint sensor, a pressure sensor, an iris sensor, a molecular sensor, a gyroscope, a barometer, a hygrometer, a thermometer, an infrared sensor, or the like. Details are not described herein.

The display unit 306 is configured to display information input by the user or information provided for the user. The display unit 306 may include the display panel 3061. The display panel 3061 may be configured in a form of a Liquid Crystal Display (LCD) or an Organic Light-Emitting Diode (OLED), or the like.

The user input unit 307 may be configured to receive input digit or character information, and generate a key signal input related to a user setting and function control of the terminal. In some implementations, the user input unit 307 may include a touch panel 3071 and other input devices 3072. The touch panel 3071, also referred to as a touchscreen, may capture a touch operation of a user on or near the touch panel 3071 (for example, an operation performed by the user by using any appropriate object or accessory such as a finger or a stylus on the touch panel 3071 or near the touch panel 3071). The touch panel 3071 may include two parts: a touch detection apparatus and a touch controller. The touch detection apparatus detects a touch orientation of the user, detects a signal brought by the touch operation, and transfers the signal to the touch controller. The touch controller receives touch information from the touch detection apparatus, converts the touch information into contact coordinates, and transmits the contact coordinates to the processor 310, and receives and executes a command transmitted by the processor 310. In addition, the touch panel 3071 may be implemented in various types, such as a resistive type, a capacitive type, an infrared type, and a surface acoustic wave type. The user input unit 307 may include other input devices 3072 in addition to the touch panel 3071. In some implementations, the other input devices 3072 may include but are not limited to a physical keyboard, a function key (such as a volume control key or a switch key), a trackball, a mouse, a joystick, or the like. Details are not described herein again.

Further, the touch panel 3071 may cover the display panel 3061. After detecting a touch operation on or near the touch panel 3071, the touch panel 3071 transfers the touch operation to the processor 310 to determine a touch event type. Subsequently, the processor 310 provides corresponding visual output on the display panel 3061 based on the touch event type. In FIG. 3, the touch panel 3071 and the display panel 3061 are used as two separate components to implement input and output functions of the terminal. However, in some embodiments, the touch panel 3071 may be integrated with the display panel 3061 to implement the input and output functions of the terminal. This is not specifically limited herein.

The interface unit 308 is an interface for an external apparatus to connect to the terminal 300. For example, the external apparatus may include a wired or wireless headphone port, an external power (or a battery charger) port, a wired or wireless data port, a memory card port, a port used to connect an apparatus with an identification module, an audio input/output (I/O) port, a video I/O port, an earphone port, and the like. The interface unit 308 may be configured to receive input (such as data information and electricity) from the external apparatus and transmits the received input to one or more elements in the terminal 300 or may be configured to transmit data between the terminal 300 and the external apparatus.

The memory 309 may be configured to store a software program and various types of data. The memory 309 may mainly include a program storage area and a data storage area. The program storage area may store an operating system, an application program required for at least one function (such as a sound playback function and an image playback function), and the like. The data storage area may store data created based on use of the mobile phone (such as audio data and a phone book), and the like. In addition, the memory 309 may include a high-speed random access memory, or may include a non-volatile memory, for example, at least one disk storage device, a flash memory device, or another volatile solid-state storage device.

The processor 310 is a control center of the terminal, connects various parts of the entire terminal by using various interfaces or lines, and performs various functions of the terminal and processes data by running or executing software programs and/or modules stored in the memory 309 and calling data stored in the memory 309, so as to perform overall monitoring on the terminal. The processor 310 may include one or more processing units. In some implementations, an application processor and a modem processor may be integrated into the processor 310. The application processor mainly processes an operating system, a user interface, an application program, and the like. The modem processor mainly processes wireless communication. It can be understood that the modem processor may not be integrated into the processor 310.

The terminal 300 may further include the power supply 311 (for example, a battery) that supplies power to the components. In some implementations, the power supply 311 may be logically connected to the processor 310 by using a power supply management system. In this way, functions such as management of charging, discharging, and power consumption are implemented by using the power supply management system.

In addition, the terminal 300 includes some function modules that are not shown. Details are not described herein again.

In some implementations, an embodiment of this disclosure further provides a terminal, including a processor, a memory, and a program that is stored in the memory and capable of running on the processor. When the program is executed by the processor, procedures in the foregoing embodiments of the method for receiving a PDSCH are implemented and the same technical effect can be achieved. To avoid repetition, details are not described herein again.

An embodiment of this disclosure further provides a computer-readable storage medium. The computer-readable storage medium stores a computer program. When the computer program is executed by a processor, procedures in the foregoing embodiments of the method for receiving a PDSCH are implemented and the same technical effect can be achieved. To avoid repetition, details are not described herein again. The computer-readable storage medium is, for example, a Read-Only Memory, (ROM), a Random Access Memory (RAM), a magnetic disk, or an optical disc.

It should be noted that in this specification, the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

Through the description of the foregoing embodiments, a person skilled in the art can clearly appreciate that the method of the foregoing embodiments may be implemented by software on a necessary general-purpose hardware platform, and certainly may be implemented by hardware. However, in many cases, the former is a more preferred implementation. Based on such an understanding, the technical solutions of this disclosure essentially or the part contributing to the prior art may be embodied in a form of a software product. The computer software product is stored in a storage medium (such as a ROM/RAM, magnetic disk, or optical disc) and includes several instructions for instructing a terminal (which may be a mobile phone, a computer, a server, an air conditioner, or a network device) to perform the methods described in the embodiments of this disclosure.

The embodiments of this disclosure are described above with reference to the accompanying drawings, but this disclosure is not limited to the foregoing implementations. The foregoing embodiments are only illustrative rather than restrictive. Inspired by this disclosure, a person of ordinary skill in the art can still derive many variations without departing from the essence of this disclosure and the protection scope of the claims. All these variations shall fall within the protection scope of this disclosure.

What is claimed is:

1. A method for receiving a Physical Downlink Shared Channel (PDSCH), performed by a terminal, wherein the method comprises:
    after occurrence of a beam failure event is determined, monitoring a Physical Downlink Control Channel (PDCCH) on a Control Resource Set for Beam Failure Recovery (CORESET-BFR) and a PDCCH on another CORESET, wherein the CORESET-BFR and the another CORESET are configured for the terminal by a network device; and
    determining a Quasi-Colocation (QCL) parameter of the PDSCH based on a QCL parameter of the PDCCH on the CORESET-BFR, a QCL parameter of the PDCCH on the another CORESET, a QCL parameter of a PDCCH on a CORESET that contains Downlink Control Information (DCI) scheduling the PDSCH, or a QCL parameter indicated by Transmission Configuration Indication (TCI) state information in the DCI scheduling the PDSCH, and receiving the PDSCH based on the determined QCL parameter,
    wherein determining a QCL parameter of the PDSCH based on a QCL parameter of the PDCCH on the CORESET-BFR, a QCL parameter of the PDCCH on the another CORESET, a QCL parameter of a PDCCH on a CORESET that contains DCI scheduling the PDSCH, or a QCL parameter indicated by TCI state information in the DCI scheduling the PDSCH comprises:
    determining that the QCL parameter of the PDSCH is the same as the QCL parameter of the PDCCH on the CORESET-BFR.

2. The method for receiving a PDSCH according to claim 1, wherein before determining a QCL parameter of the PDSCH, the method further comprises:
    receiving configuration information, sent by the network device, of the CORESET-BFR and the another CORESET, wherein the configuration information comprises TCI state information used to indicate the QCL parameter of the PDCCH on the CORESET-BFR and TCI state information used to indicate the QCL parameter of the PDCCH on the another CORESET.

3. The method for receiving a PDSCH according to claim 1, wherein before monitoring a PDCCH on a CORESET-BFR, the method further comprises:
    sending a beam failure recovery request to the network device; and
    wherein monitoring a PDCCH on a CORESET-BFR comprises:
    monitoring response information in the PDCCH on the CORESET-BFR, wherein the response information is response information fed back by the network device in response to the beam failure recovery request.

4. The method for receiving a PDSCH according to claim 1, wherein monitoring a PDCCH on a CORESET-BFR and a PDCCH on another CORESET comprises:
    monitoring response information in the PDCCH on the CORESET-BFR within a monitoring window configured by the network device; and monitoring the PDCCH on the another CORESET within the monitoring window or outside the monitoring window.

5. The method for receiving a PDSCH according to claim 1, wherein determining a QCL parameter of the PDSCH based on a QCL parameter of the PDCCH on the CORESET-BFR, a QCL parameter of the PDCCH on the another CORESET, a QCL parameter of a PDCCH on a CORESET that contains DCI scheduling the PDSCH, or a QCL parameter indicated by TCI state information in the DCI scheduling the PDSCH comprises:
when a time interval between a time of receiving the DCI and a time of receiving the PDSCH scheduled by the DCI is less than a preset threshold, using a first approach to determine the QCL parameter of the PDSCH, wherein the first approach is one of the following approaches:
determining that the QCL parameter of the PDSCH is the same as the QCL parameter of the PDCCH on the CORESET-BFR;
determining that the QCL parameter of the PDSCH is the same as a QCL parameter of a PDCCH on a preset CORESET in the another CORESET;
determining that the QCL parameter of the PDSCH is the same as a QCL parameter of a PDCCH on a preset CORESET in all CORESETs, wherein all the CORESETs comprise the CORESET-BFR and the another CORESET;
determining that the QCL parameter of the PDSCH is the same as the QCL parameter of the PDCCH on the CORESET that contains the DCI scheduling the PDSCH; or
determining that the QCL parameter of the PDSCH is the same as a QCL parameter of a PDCCH on a preset CORESET of a CORESET that contains a plurality of pieces of DCI scheduling the PDSCH.

6. The method for receiving a PDSCH according to claim 5, wherein using a first approach to determine the QCL parameter of the PDSCH when a time interval between a time of receiving the DCI and a time of receiving the PDSCH scheduled by the DCI is less than a preset threshold comprises:
in a case that the DCI contains no TCI state information used to indicate a QCL parameter and the time interval is less than the preset threshold, using the first approach to determine the QCL parameter of the PDSCH;
in a case that the network device configures a preset parameter for the terminal, wherein the preset parameter is used to indicate whether the DCI contains TCI state information, a value of the preset parameter is valid, and the time interval is less than the preset threshold, using the first approach to determine the QCL parameter of the PDSCH; or
in a case that the network device configures the preset parameter for the terminal, a value of the preset parameter is invalid, and the time interval is less than the preset threshold, using the first approach to determine the QCL parameter of the PDSCH.

7. The method for receiving a PDSCH according to claim 5, wherein the preset CORESET is a CORESET with a smallest ID in one or more CORESETs that are configured with a search space within a slot in which search space is configured for the terminal.

8. The method for receiving a PDSCH according to claim 1, wherein determining a QCL parameter of the PDSCH based on a QCL parameter of the PDCCH on the CORESET-BFR, a QCL parameter of the PDCCH on the another CORESET, a QCL parameter of a PDCCH on a CORESET that contains DCI scheduling the PDSCH, or a QCL parameter indicated by TCI state information in the DCI scheduling the PDSCH comprises:
in a case that a time interval between a time of receiving the DCI and a time of receiving the PDSCH scheduled by the DCI is greater than or equal to a preset threshold, using a second approach to determine the QCL parameter of the PDSCH, wherein the second approach is one of the following approaches:
determining that the QCL parameter of the PDSCH is the same as the QCL parameter of the PDCCH on the CORESET-BFR;
in a case that the network device configures a preset parameter for the terminal, wherein the preset parameter is used to indicate whether the DCI contains TCI state information, and a value of the preset parameter is valid, determining that the QCL parameter of the PDSCH is the QCL parameter indicated by the TCI state information in the DCI scheduling the PDSCH;
in a case that the DCI contains no TCI state information used to indicate a QCL parameter, determining that the QCL parameter of the PDSCH is the same as the QCL parameter of the PDCCH on the CORESET that contains the DCI scheduling the PDSCH; or
in a case that the network device configures the preset parameter for the terminal and a value of the preset parameter is invalid, determining that the QCL parameter of the PDSCH is the same as the QCL parameter of the PDCCH on the CORESET that contains the DCI scheduling the PDSCH.

9. The method for receiving a PDSCH according to claim 1, wherein after determining a QCL parameter of the PDSCH based on a QCL parameter of the PDCCH on the CORESET-BFR, a QCL parameter of the PDCCH on the another CORESET, a QCL parameter of a PDCCH on a CORESET that contains DCI scheduling the PDSCH, or a QCL parameter indicated by TCI state information in the DCI scheduling the PDSCH, the method further comprises:
redetermining the QCL parameter of the PDSCH when receiving from the network device a reconfiguration, activation, or indication for TCI state information of PDCCHs in all CORESETs, wherein all the CORESETs comprise the CORESET-BFR and the another CORESET;
redetermining the QCL parameter of the PDSCH when receiving from the network device a reconfiguration, activation, or indication for TCI state information of the PDCCH on the CORESET-BFR;
redetermining the QCL parameter of the PDSCH when receiving from the network device a reconfiguration, activation, or indication for TCI state information of a PDCCH on any CORESET in all the CORESETs;
redetermining the QCL parameter of the PDSCH when receiving from the network device a reconfiguration, activation, or indication for TCI state information of a PDCCH on any CORESET in the another CORESET; or
redetermining the QCL parameter of the PDSCH when receiving from the network device a reconfiguration, activation, or indication for TCI state information of PDCCHs on all the other CORESETs.

10. A terminal, comprising:
a memory storing computer-readable instructions;
a processor coupled to the memory and configured to execute the computer-readable instructions, wherein the computer-readable instructions, when executed by the processor, causes the processor to perform operations comprising:

after occurrence of a beam failure event is determined, monitoring a Physical Downlink Control Channel (PDCCH) on a Control Resource Set for Beam Failure Recovery (CORESET-BFR) and a PDCCH on another CORESET, wherein the CORESET-BFR and the another CORESET are configured for the terminal by a network device; and determining a Quasi-Colocation (QCL) parameter of a Physical Downlink Shared Channel (PDSCH) based on a QCL parameter of the PDCCH on the CORESET-BFR, a QCL parameter of the PDCCH on the another CORESET, a QCL parameter of a PDCCH on a CORESET that contains Downlink Control Information (DCI) scheduling the PDSCH, or a QCL parameter indicated by Transmission Configuration Indication (TCI) state information in the DCI scheduling the PDSCH, and receiving the PDSCH based on the determined QCL parameter, wherein determining a QCL parameter of the PDSCH based on a QCL parameter of the PDCCH on the CORESET-BFR, a QCL parameter of the PDCCH on the another CORESET, a QCL parameter of a PDCCH on a CORESET that contains DCI scheduling the PDSCH, or a QCL parameter indicated by TCI state information in the DCI scheduling the PDSCH comprises:

determining that the QCL parameter of the PDSCH is the same as the QCL parameter of the PDCCH on the CORESET-BFR.

11. The terminal according to claim 10, wherein, before determining a QCL parameter of the PDSCH, the operations further comprise:

receiving configuration information, sent by the network device, of the CORESET-BFR and the another CORESET, wherein the configuration information comprises TCI state information used to indicate the QCL parameter of the PDCCH on the CORESET-BFR and TCI state information used to indicate the QCL parameter of the PDCCH on the another CORESET.

12. The terminal according to claim 10, wherein, before monitoring a PDCCH on a CORESET-BFR, the operations further comprise:

sending a beam failure recovery request to the network device; and wherein monitoring a PDCCH on a CORESET-BFR comprises:

monitoring response information in the PDCCH on the CORESET-BFR, wherein the response information is response information fed back by the network device in response to the beam failure recovery request.

13. The terminal according to claim 10, wherein monitoring a PDCCH on a CORESET-BFR and a PDCCH on another CORESET comprises:

monitoring response information in the PDCCH on the CORESET-BFR within a monitoring window configured by the network device; and monitoring the PDCCH on the another CORESET within the monitoring window or outside the monitoring window.

14. The terminal according to claim 10, wherein determining a QCL parameter of the PDSCH based on a QCL parameter of the PDCCH on the CORESET-BFR, a QCL parameter of the PDCCH on the another CORESET, a QCL parameter of a PDCCH on a CORESET that contains DCI scheduling the PDSCH, or a QCL parameter indicated by TCI state information in the DCI scheduling the PDSCH comprises:

when a time interval between a time of receiving the DCI and a time of receiving the PDSCH scheduled by the DCI is less than a preset threshold, using a first approach to determine the QCL parameter of the PDSCH, wherein the first approach is one of the following approaches:

determining that the QCL parameter of the PDSCH is the same as the QCL parameter of the PDCCH on the CORESET-BFR;

determining that the QCL parameter of the PDSCH is the same as a QCL parameter of a PDCCH on a preset CORESET in the another CORESET;

determining that the QCL parameter of the PDSCH is the same as a QCL parameter of a PDCCH on a preset CORESET in all CORESETs, wherein all the CORESETs comprise the CORESET-BFR and the another CORESET;

determining that the QCL parameter of the PDSCH is the same as the QCL parameter of the PDCCH on the CORESET that contains the DCI scheduling the PDSCH; or determining that the QCL parameter of the PDSCH is the same as a QCL parameter of a PDCCH on a preset CORESET of a CORESET that contains a plurality of pieces of DCI scheduling the PDSCH.

15. The terminal according to claim 14, wherein using a first approach to determine the QCL parameter of the PDSCH when a time interval between a time of receiving the DCI and a time of receiving the PDSCH scheduled by the DCI is less than a preset threshold comprises:

in a case that the DCI contains no TCI state information used to indicate a QCL parameter and the time interval is less than the preset threshold, using the first approach to determine the QCL parameter of the PDSCH;

in a case that the network device configures a preset parameter for the terminal, wherein the preset parameter is used to indicate whether the DCI contains TCI state information, a value of the preset parameter is valid, and the time interval is less than the preset threshold, using the first approach to determine the QCL parameter of the PDSCH; or in a case that the network device configures the preset parameter for the terminal, a value of the preset parameter is invalid, and the time interval is less than the preset threshold, using the first approach to determine the QCL parameter of the PDSCH.

16. The terminal according to claim 10, wherein determining a QCL parameter of the PDSCH based on a QCL parameter of the PDCCH on the CORESET-BFR, a QCL parameter of the PDCCH on the another CORESET, a QCL parameter of a PDCCH on a CORESET that contains DCI scheduling the PDSCH, or a QCL parameter indicated by TCI state information in the DCI scheduling the PDSCH comprises:

in a case that a time interval between a time of receiving the DCI and a time of receiving the PDSCH scheduled by the DCI is greater than or equal to a preset threshold, using a second approach to determine the QCL parameter of the PDSCH, wherein the second approach is one of the following approaches:

determining that the QCL parameter of the PDSCH is the same as the QCL parameter of the PDCCH on the CORESET-BFR;

in a case that the network device configures a preset parameter for the terminal, wherein the preset parameter is used to indicate whether the DCI contains TCI state information, and a value of the preset parameter is valid, determining that the QCL parameter of the PDSCH is the QCL parameter indicated by the TCI state information in the DCI scheduling the PDSCH;

in a case that the DCI contains no TCI state information used to indicate a QCL parameter, determining that the QCL parameter of the PDSCH is the same as the QCL parameter of the PDCCH on the CORESET that contains the DCI scheduling the PDSCH; or in a case that the network device configures the preset parameter for the terminal and a value of the preset parameter is invalid, determining that the QCL parameter of the PDSCH is the same as the QCL parameter of the PDCCH on the CORESET that contains the DCI scheduling the PDSCH.

17. The terminal according to claim 10, wherein, after determining a QCL parameter of the PDSCH based on a QCL parameter of the PDCCH on the CORESET-BFR, a QCL parameter of the PDCCH on the another CORESET, a QCL parameter of a PDCCH on a CORESET that contains DCI scheduling the PDSCH, or a QCL parameter indicated by TCI state information in the DCI scheduling the PDSCH, the operations further comprise:

redetermining the QCL parameter of the PDSCH when receiving from the network device a reconfiguration, activation, or indication for TCI state information of PDCCHs in all CORESETs, wherein all the CORESETs comprise the CORESET-BFR and the another CORESET;

redetermining the QCL parameter of the PDSCH when receiving from the network device a reconfiguration, activation, or indication for TCI state information of the PDCCH on the CORESET-BFR;

redetermining the QCL parameter of the PDSCH when receiving from the network device a reconfiguration, activation, or indication for TCI state information of a PDCCH on any CORESET in all the CORESETs;

redetermining the QCL parameter of the PDSCH when receiving from the network device a reconfiguration, activation, or indication for TCI state information of a PDCCH on any CORESET in the another CORESET; or redetermining the QCL parameter of the PDSCH when receiving from the network device a reconfiguration, activation, or indication for TCI state information of PDCCHs on all the other CORESETs.

18. A non-transitory computer-readable medium, storing computer-readable instructions that, when executed by a processor, causes the processor to perform operations comprising:

after occurrence of a beam failure event is determined, monitoring a Physical Downlink Control Channel (PDCCH) on a Control Resource Set for Beam Failure Recovery (CORESET-BFR) and a PDCCH on another CORESET, wherein the CORESET-BFR and the another CORESET are configured for the terminal by a network device; and determining a Quasi-Colocation (QCL) parameter of the Physical Downlink Shared Channel (PDSCH), based on a QCL parameter of the PDCCH on the CORESET-BFR, a QCL parameter of the PDCCH on the another CORESET, a QCL parameter of a PDCCH on a CORESET that contains Downlink Control Information (DCI) scheduling the PDSCH, or a QCL parameter indicated by Transmission Configuration Indication (TCI) state information in the DCI scheduling the PDSCH, and receiving the PDSCH based on the determined QCL parameter, wherein determining a QCL parameter of the PDSCH based on a QCL parameter of the PDCCH on the CORESET-BFR, a QCL parameter of the PDCCH on the another CORESET, a QCL parameter of a PDCCH on a CORESET that contains DCI scheduling the PDSCH, or a QCL parameter indicated by TCI state information in the DCI scheduling the PDSCH comprises:

determining that the QCL parameter of the PDSCH is the same as the QCL parameter of the PDCCH on the CORESET-BFR.

19. The non-transitory computer-readable medium according to claim 18, wherein before determining a QCL parameter of the PDSCH, the operations further comprise:

receiving configuration information, sent by the network device, of the CORESET-BFR and the another CORESET, wherein the configuration information comprises TCI state information used to indicate the QCL parameter of the PDCCH on the CORESET-BFR and TCI state information used to indicate the QCL parameter of the PDCCH on the another CORESET.

20. The non-transitory computer-readable medium according to claim 18, wherein before monitoring a PDCCH on a CORESET-BFR, the operations further comprise:

sending a beam failure recovery request to the network device; and wherein monitoring a PDCCH on a CORESET-BFR comprises:

monitoring response information in the PDCCH on the CORESET-BFR, wherein the response information is response information fed back by the network device in response to the beam failure recovery request.

* * * * *